G. D. LANTERMAN.
LOCK FOR AUTOMOBILE ENGINES.
APPLICATION FILED NOV. 10, 1914.

1,260,919.

Patented Mar. 26, 1918.

Witnesses
Benjamin Finckel
C. Lowenrohn

Inventor
George D. Lanterman
By Finckel & Finckel
Attorneys

UNITED STATES PATENT OFFICE.

GEORGE D. LANTERMAN, OF COLUMBUS, OHIO, ASSIGNOR OF ONE-HALF TO DANIEL CARROLL, OF COLUMBUS, OHIO.

LOCK FOR AUTOMOBILE-ENGINES.

1,260,919.　　　　Specification of Letters Patent.　　Patented Mar. 26, 1918.

Application filed November 10, 1914.　Serial No. 871,247.

*To all whom it may concern:*

Be it known that I, GEORGE D. LANTERMAN, a citizen of the United States, residing at Columbus, in the county of Franklin and State of Ohio, have invented a certain new and useful Improvement in Locks for Automobile-Engines, of which the following is a specification.

The object of this invention is to provide a lock of simple, inexpensive and easily applied form for that variety of automobile known as the "Ford" to prevent its unauthorized use or theft.

The invention is embodied in the example herein particularly shown and described, the feature of novelty being claimed at the close of the detailed description.

In the accompanying drawing—

Figure 1:
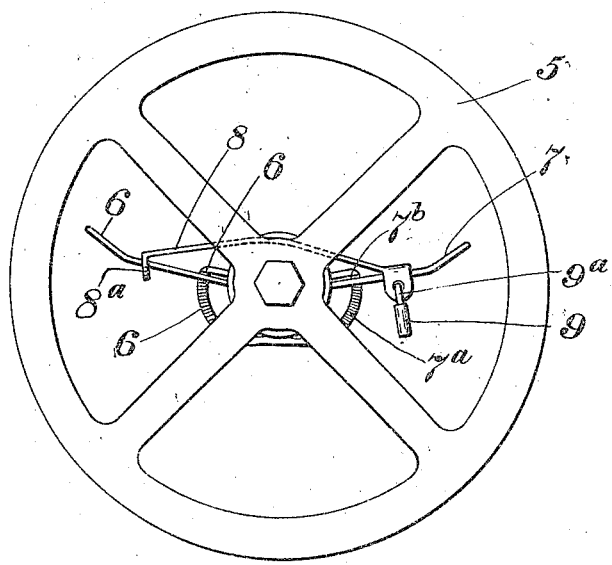
Figure 1 is a plan view of the steering wheel and fuel and spark controlling and regulating means showing my lock applied thereto.
Figure 2:
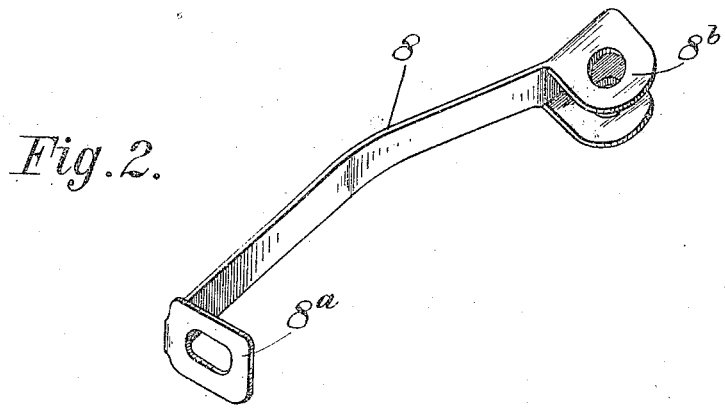
Fig. 2 is a perspective view on a larger scale of the member for engaging the aforesaid controlling levers.

In the views 5 designates the usual steering wheel. 6 the fuel controlling lever and 7 the spark controlling lever. The said levers are fulcrumed near the steering wheel shaft and oscillate over the usual ratcheted sectors $6^a$ and $7^a$ respectively. The sectors $6^a$ and $7^a$ have upper terminal lugs $6^b$ and $7^b$ respectively that limit the upward movement of the levers. The uppermost positions of said levers are those in which the fuel is cut off and the spark cut out, as well understood, so that if said levers be locked in those positions the automobile is locked from effective operation. My invention, therefore, includes a rod or bar 8, advantageously of hard steel, provided with a bent-down loop $8^a$ at one end to slip onto the fuel lever and a bent-down clip or fork $8^b$ at the other to straddle the spark lever, the tangs of the latter being provided with eyes through which the steel hasp $9^a$ of a suitable padlock 9 can be passed to inclose the lever and lock the bar 8 from substantial movement or removal. The bar 8 is extended across the upper side of the steering wheel shaft housing so that when the bar is engaged with the levers as described neither can be moved to supply fuel to the cylinders or spark to the fuel.

The form and application of the invention can be changed without departing from the invention as claimed.

What I claim is:

1. An automobile lock adapted to lock the throttle and spark control levers in their inoperative position, comprising a bar having a looped end adapted to pass over and secure one of the levers in its inoperative position, a forked end adapted to embrace the other lever, and means adapted to lock the fork in position over its coöperating lever, a part of said bar being adapted to bear against a member fixed with respect to said levers whereby displacement of the bar and movement of said levers is prevented.

2. An automobile lock adapted to lock the throttle and spark control levers in their inoperative position, comprising a bar having a looped end adapted to pass over and secure one of the levers in its inoperative position, a forked end adapted to embrace the other lever, and means adapted to lock the fork in position over its coöperating lever, a part of said bar being adapted to be engaged by the steering wheel shaft housing of the automobile whereby displacement of the bar and movement of said levers is prevented.

GEORGE D. LANTERMAN.

Witnesses:
　BENJAMIN FINCKEL,
　DANIEL CARROLL.